(12) United States Patent
Harman

(10) Patent No.: US 7,802,583 B2
(45) Date of Patent: Sep. 28, 2010

(54) FLUID FLOW CONTROL DEVICE

(75) Inventor: Jayden David Harman, San Rafael, CA (US)

(73) Assignee: New Pax, Inc., San Rafael, CA (US)

( * ) Notice: Subject to any disclaimer, the term of this patent is extended or adjusted under 35 U.S.C. 154(b) by 0 days.

(21) Appl. No.: 11/323,137

(22) Filed: Dec. 29, 2005

(65) Prior Publication Data

US 2006/0102239 A1   May 18, 2006

Related U.S. Application Data

(63) Continuation of application No. PCT/AU2004/000862, filed on Jun. 29, 2004.

(30) Foreign Application Priority Data

Jul. 2, 2003   (AU) ............................... 2003903386

(51) Int. Cl.
   *F15C 1/16*   (2006.01)
(52) U.S. Cl. .............................. 137/1; 138/39; 137/808
(58) Field of Classification Search ............. 137/561 A, 137/592, 808, 12, 1; 138/39
   See application file for complete search history.

(56) References Cited

U.S. PATENT DOCUMENTS

| | | |
|---|---|---|
| 11,544 A | 8/1854 | Andrews |
| 700,785 A | 5/1902 | Kull |
| 794,926 A | 7/1905 | Crawford |
| 871,825 A | 11/1907 | Schupmann |
| 879,583 A | 2/1908 | Pratt |
| 943,233 A | 12/1909 | Boyle |
| 965,135 A | 7/1910 | Gibson |
| 969,101 A | 8/1910 | Gibson |
| 1,023,225 A | 4/1912 | Shlosberg |
| 1,272,180 A | 7/1918 | Andresen |
| 1,353,478 A | 9/1920 | Jeffries, Sr. |
| 1,356,676 A | 10/1920 | Weller et al. |
| 1,396,583 A | 11/1921 | Krafve |
| 1,471,697 A | 10/1923 | Kubes |
| 1,505,893 A | 8/1924 | Hunter et al. |
| 1,658,126 A | 2/1928 | Jehle |

(Continued)

FOREIGN PATENT DOCUMENTS

AU    B-62946/96    7/1998

(Continued)

OTHER PUBLICATIONS

Derwent Abstract Accession No. 97-198067/18, JP 09053787 A (Kajima Corp) Feb. 25, 1997.

(Continued)

*Primary Examiner*—John Rivell
*Assistant Examiner*—Craig M Schneider
(74) *Attorney, Agent, or Firm*—Carr & Ferrell LLP

(57) ABSTRACT

A flow controller adapted to control a flow of fluid within the flow controller, the flow controller having a flow path adapted to convey said fluid, wherein the cross-sectional area of the flow path varies along the flow path and wherein in at least a portion of its length the flow controller comprises an active surface capable of influencing the fluid flow through the flow path to cause vortical motion of the fluid within the fluid pathway.

27 Claims, 8 Drawing Sheets

U.S. PATENT DOCUMENTS

| | | |
|---|---|---|
| 1,667,186 A | 4/1928 | Bluehdorn |
| 1,709,217 A | 4/1929 | Hamilton |
| 1,713,047 A | 5/1929 | Maxim |
| 1,729,018 A | 9/1929 | Siders |
| 1,756,916 A | 4/1930 | Stranahan |
| 1,785,460 A | 12/1930 | Schlotter |
| 1,799,039 A | 3/1931 | Conejos |
| 1,812,413 A | 6/1931 | Reynolds |
| 1,816,245 A | 7/1931 | Wolford |
| 1,872,075 A | 8/1932 | Dolza |
| 1,891,170 A | 12/1932 | Nose |
| 1,919,250 A | 7/1933 | Olson |
| 2,068,686 A | 1/1937 | Lascroux |
| 2,139,736 A | 12/1938 | Durham |
| 2,165,808 A | 7/1939 | Murphy |
| 2,210,031 A | 8/1940 | Greene |
| 2,359,365 A | 10/1944 | Katcher |
| 2,879,861 A | 3/1959 | Belsky et al. |
| 2,908,344 A | 10/1959 | Maruo |
| 2,912,063 A | 11/1959 | Barnes |
| 2,958,390 A | 11/1960 | Montague |
| 3,066,755 A | 12/1962 | Diehl |
| 3,071,159 A | 1/1963 | Coraggioso |
| 3,076,480 A | 2/1963 | Vicard |
| 3,081,826 A | 3/1963 | Loiseau |
| 3,082,695 A | 3/1963 | Buschhorn |
| 3,215,165 A | 11/1965 | Boadway |
| 3,232,341 A | 2/1966 | Woodworth |
| 3,339,631 A | 9/1967 | McGurty |
| 3,371,472 A | 3/1968 | Krizman, Jr. |
| 3,407,995 A | 10/1968 | Kinsworthy |
| 3,584,701 A | 6/1971 | Freeman |
| 3,692,422 A | 9/1972 | Girardier |
| 3,800,951 A | 4/1974 | Mourlon et al. |
| 3,918,829 A | 11/1975 | Korzec |
| 3,927,731 A | 12/1975 | Lancaster |
| 3,940,060 A | 2/1976 | Viets |
| 3,957,133 A | 5/1976 | Johnson |
| 3,964,841 A | 6/1976 | Strycek |
| 4,050,539 A | 9/1977 | Kashiwara et al. |
| 4,182,596 A | 1/1980 | Wellman |
| 4,206,783 A | 6/1980 | Brombach |
| 4,211,183 A | 7/1980 | Hoult |
| 4,225,102 A | 9/1980 | Rao et al. |
| 4,299,553 A | 11/1981 | Swaroop |
| 4,317,502 A | 3/1982 | Harris et al. |
| 4,323,209 A | 4/1982 | Thompson |
| 4,331,213 A | 5/1982 | Taniguchi |
| 4,505,297 A | 3/1985 | Leech, III et al. |
| 4,533,015 A | 8/1985 | Kojima |
| 4,540,334 A | 9/1985 | Stahle |
| 4,579,195 A | 4/1986 | Nieri |
| 4,644,135 A | 2/1987 | Daily |
| 4,679,621 A | 7/1987 | Michele |
| 4,685,534 A | 8/1987 | Burstein et al. |
| 4,699,340 A | 10/1987 | Rethorst |
| 4,823,865 A | 4/1989 | Hughes |
| 4,834,142 A | 5/1989 | Johannessen |
| 4,993,487 A | 2/1991 | Niggemann |
| 4,996,924 A | 3/1991 | McClain |
| 5,010,910 A | 4/1991 | Hickey |
| 5,040,558 A | 8/1991 | Hickey et al. |
| 5,052,442 A | 10/1991 | Johannessen |
| 5,058,837 A | 10/1991 | Wheeler |
| 5,100,242 A | 3/1992 | Latto |
| 5,139,215 A | 8/1992 | Peckham |
| 5,181,537 A | 1/1993 | Powers |
| 5,207,397 A | 5/1993 | Ng et al. |
| 5,220,955 A | 6/1993 | Stokes |
| 5,249,993 A | 10/1993 | Martin |
| 5,261,745 A | 11/1993 | Watkins |
| 5,312,224 A | 5/1994 | Batchelder et al. |
| 5,337,789 A | 8/1994 | Cook |
| 5,382,092 A | 1/1995 | Okamoto et al. |
| 5,624,229 A | 4/1997 | Kotzur et al. |
| 5,661,638 A | 8/1997 | Mira |
| 5,741,118 A | 4/1998 | Shinbara et al. |
| 5,787,974 A | 8/1998 | Pennington |
| 5,844,178 A | 12/1998 | Lothringen |
| 5,891,148 A | 4/1999 | Deckner |
| 5,934,612 A | 8/1999 | Gerhardt |
| 5,934,877 A | 8/1999 | Harman |
| 5,943,877 A | 8/1999 | Chen |
| 5,954,124 A | 9/1999 | Moribe et al. |
| 6,050,772 A | 4/2000 | Hatakeyama et al. |
| 6,179,218 B1 | 1/2001 | Gates |
| 6,241,221 B1 | 6/2001 | Wegner et al. |
| 6,273,679 B1 | 8/2001 | Na |
| 6,374,858 B1 | 4/2002 | Hides et al. |
| 6,382,348 B1 | 5/2002 | Chen |
| 6,385,967 B1 | 5/2002 | Chen |
| 6,415,888 B2 | 7/2002 | An et al. |
| 6,484,795 B1 | 11/2002 | Kasprzyk |
| 6,604,906 B2 | 8/2003 | Ozeki et al. |
| 6,623,838 B1 | 9/2003 | Nomura et al. |
| 6,632,071 B2 | 10/2003 | Pauly |
| 6,669,142 B2 | 12/2003 | Saiz |
| 6,684,633 B2 | 2/2004 | Jett |
| D487,800 S | 3/2004 | Chen et al. |
| 6,702,552 B1 | 3/2004 | Harman |
| 6,817,419 B2 | 11/2004 | Reid |
| 6,892,988 B2 | 5/2005 | Hugues |
| 6,932,188 B2 | 8/2005 | Ni |
| D509,584 S | 9/2005 | Li et al. |
| 6,959,782 B2 | 11/2005 | Brower et al. |
| 7,117,973 B2 | 10/2006 | Graefenstein |
| D539,413 S | 3/2007 | Parker et al. |
| 2002/0148777 A1 | 10/2002 | Tuszko et al. |
| 2003/0012649 A1 | 1/2003 | Sakai et al. |
| 2003/0190230 A1 | 10/2003 | Ito |
| 2004/0037986 A1 | 2/2004 | Houston et al. |
| 2004/0238163 A1 | 12/2004 | Harman |
| 2004/0244853 A1 | 12/2004 | Harman |
| 2005/0011700 A1 | 1/2005 | Dadd |
| 2005/0155916 A1 | 7/2005 | Tuszko et al. |
| 2005/0269458 A1 | 12/2005 | Harman |
| 2006/0249283 A1 | 11/2006 | Harman |
| 2007/0003414 A1 | 1/2007 | Harman |
| 2007/0025846 A1 | 2/2007 | Harman |

FOREIGN PATENT DOCUMENTS

| | | |
|---|---|---|
| DE | 003315258 | 10/1984 |
| EP | 14257 | 8/1980 |
| EP | 0 598 253 A1 | 5/1994 |
| FR | 2534981 | 10/1982 |
| FR | 2666031 | 2/1992 |
| GB | 893135 | 7/1961 |
| GB | 2057567 A | 4/1981 |
| GB | 2 063 365 A | 6/1981 |
| JP | 98264 | 6/1932 |
| JP | S54129699 | 10/1979 |
| JP | 05332121 | 12/1993 |
| JP | 2000257610 | 9/2000 |
| JP | D1243052 | 6/2005 |
| SU | 431850 | 8/1975 |
| SU | 858896 | 12/1979 |
| SU | 738566 | 6/1980 |
| SU | 850104 | 7/1981 |
| SU | 1030631 | 7/1983 |
| TW | 565374 | 3/2002 |
| TW | M287387 | 2/2006 |
| WO | WO 81/03201 | 11/1981 |
| WO | WO 87/07048 | 11/1987 |

| WO | WO 89/08750 | 9/1989 |
| WO | WO 00/38591 | 7/2000 |
| WO | WO 01/14782 A1 | 3/2001 |
| WO | WO 03/056228 A1 | 7/2003 |
| WO | WO 03/056269 A1 | 7/2003 |
| WO | PCT/AU2004/001388 | 5/2004 |
| WO | WO 2005/073561 A1 | 8/2005 |

OTHER PUBLICATIONS

Derwent Abstract Accession No. L0015B/47, SE 7803739 A (Ingenjorsfirma Garl) Nov. 5, 1979.
Derwent Abstraction Accession No. 89-157673, SU 1437579A (Lengd Kalinin Poly) Nov. 15, 1988.
Derwent Abstract Accession No. 99-249047/32, JP 11072104 A (Saito Jidosha Shatai Kogyo KK) Mar. 16, 1999.
Derwent Abstract Accession No. 87-318963/45, SU 1291726 A (Makeevka Eng Cons) Feb. 23, 1987.
Patent Abstracts of Japan, Publication No. 2000-168632, Jun. 20, 2000, "Low Air Resistance Vehicle Body Using Vortex Ring."
Foster, K. et al., "Fluidics: Components and Circuits," Wiley-Interscience, London, 1971, pp. 219-221.
Dr. Knott, Ron, "The Golden Section Ratio: Phi," Available at http://www.mcs.surrey.ac.uk/Personal/R.Knott/Fibonacci/phi.html (last accessed Mar. 17, 2006).
Karassik et al., "Pump Handbook," published 1976 by McGraw-Hill, Inc.
McLarty, W., et al., "Phi Geometry: Impeller & Propeller Design for Fluids Handling," Oct. 1999, Offshore Magazine, pp. 123 (and continued).
Batchelor, G. K., "An Introduction to Fluid Dynamics", Cambridge Mathematical Library, 2000.
The CAD Guidebook, A Basic Manual for Understanding and Improving Computer-Aided Design, Stephen J. Schoonmaker, Marcel Dekker, Inc., New York, 2002.
Merriam-Webster Online Dictionary, 2010 http://www.merriam-webster.com/dictionary/spiral, Feb. 23, 2010, two pages.
Merriam-Webster Online Dictionary, 2010 http://www.merriam-webster.com/dictionary/curve, Feb. 23, 2010, two pages.
Merriam-Webster Online Dictionary, 2010 http://www.merriam-webster.com/dictionary/vortex, Feb. 23, 2010, two pages.
Merriam-Webster Online Dictionary, 2010 http://www.merriam-webster.com/dictionary/vortical, Feb. 23, 2010, two pages.
Office Action mailed Jul. 22, 2010 in U.S. Appl. No. 10/882,412, filed Jun. 30, 2004.

FLUID FLOW CONTROL DEVICE

CROSS-REFERENCE TO RELATED APPLICATIONS

This application is a continuation and claims the priority benefit of Patent Cooperation Treaty application number PCT/AU2004/000862 filed Jun. 29, 2004, which claims the priority benefit of Australian patent application number 2003903386 filed Jul. 2, 2003. The disclosure of these commonly owned applications is incorporated herein by reference. This application is also related to U.S. patent application Ser. No. 10/882,412 filed Jun. 30, 2004.

BACKGROUND OF THE INVENTION

1. Field of the Invention

The present invention relates to nozzles, diffusers and venturis. It may be applied in any application in which conventional nozzles, diffusers and venturis are used.

2. Description of the Related Art

Nozzles, diffusers and venturis are specific types of ducts used in relation to the flow of fluid. For the purpose of this specification, a nozzle is intended to mean a duct of varying cross-sectional area which is designed so that fluid flow is accelerated by a pressure differentiated between the inlet and the outlet. A diffuser is intended to mean a duct of varying cross-sectional area which is designed so that fluid flow is decelerated by an increase of pressure between the inlet and the outlet. A venturi can be seen as a duct comprising a nozzle section and diffuser section abutted in tandem.

Nozzles are widely used in the field of fluid flow as a means to provide an accelerated stream of fluid and have many applications. Diffusers are used to decelerate fluid flow and again have many applications. Venturis are used to cause a short region of accelerated flow in a duct. It is a well known law of thermodynamics that the accelerated fluid flow is accompanied by a reduced pressure, and that many applications of venturis are directed to utilising the reduced pressure.

While nozzles, diffusers and venturis are widely used, it is also well known that their performance is affected considerably by turbulence and frictional losses. These factors significantly limit the uses to which such devices can be applied.

SUMMARY OF THE INVENTION

Accordingly, an exemplary embodiment of the present invention provides a flow controller adapted to control a flow of fluid within the controller, the flow controller having a flow path adapted to convey said fluid, wherein the cross-sectional area of the flow path varies along the flow path and wherein in at least a portion of its length the flow controller comprises an active surface capable of influencing the fluid flow through the flow path.

According to an exemplary embodiment of the invention, the active surface is adapted to cause rotational motion of fluid within the fluid pathway about the axis of flow of the fluid.

According to an exemplary embodiment of the invention, the active surface is adapted to cause vortical motion of fluid within the fluid pathway about the axis of flow of the fluid.

According to an exemplary embodiment of the invention, the configuration of the active surface conforms to at least one logarithmic curve conforming to the Golden Section.

According to an exemplary embodiment of the invention the curvature of the active surface is uni-dimensional.

According to an exemplary embodiment of the invention the curvature of the active surface is bi-dimensional.

According to an exemplary embodiment of the invention, the curvature of the active surface varies in accordance with the Golden Section.

According to an exemplary embodiment of the invention, the curvature of the active surface conforms to an equiangular spiral.

According to an exemplary embodiment of the invention the curvature of the active surface is transverse to the central axis of the fluid pathway.

According to an exemplary embodiment of the invention the curvature of the active surface can be in a direction parallel to the central axis.

According to an exemplary embodiment of the invention the curvature of the active surface is both transverse to the central axis and is parallel to the direction of the central axis to define a three-dimensional surface conforming substantially or in the greater part to the Golden Section.

According to an exemplary embodiment of the invention, the fluid pathway has a spiral configuration. According to a preferred embodiment the configuration takes the form of a logarithmic helix or a volute or a whorl.

According to an exemplary embodiment of the invention, the cross-sectional area of the flow path varies logarithmically substantially or in greater part in conformity to the Golden Section.

According to an exemplary embodiment of the invention, the cross-sectional area of the flow path varies to cause the incremental volume of the flow path to vary logarithmically.

According to an exemplary embodiment of the invention, the incremental volume is caused to vary in conformity with the Golden Ratio.

According to an exemplary embodiment of the invention, the active surface has the configuration conforming to the external configuration of a shell of the phylum Mollusca, class Gastropoda or Cephalopoda. According to exemplary forms of the invention the active surface conforms to the external configuration of shells selected from the genera *Volutidea, Argonauta, Nautilus, Conidea* or *Turbinidea*.

According to an exemplary embodiment of the invention, the active surface has the configuration of the interior of shells of the phylum Mollusca; classes Gastropoda or Cephalopoda. In particular embodiments, the active surface has the configuration of the interior of shells selected from the genera *Volutidea, Conidea, Turbinidea, Argonauta,* or *Nautilus*.

According to an exemplary embodiment of the invention, the configuration of the flow controller promotes substantially radially laminar fluid flow.

According to an exemplary embodiment of the invention, the flow controller comprises a nozzle.

According to an exemplary embodiment of the invention, the flow controller comprises a diffuser.

According to an exemplary embodiment of the invention, the flow controller comprises a venturi.

DETAILED DESCRIPTION

An embodiment of the invention is directed to a flow controller, the structure of which is configured to cause the rate of a fluid flow to be altered during passage through the controller. Each of the embodiments is directed to a flow controller adapted to alter the rate of flow of a fluid.

It has been found that all fluids when moving under the influence of the natural forces of Nature, tend to move in spirals or vortices. These spirals or vortices generally comply to a mathematical progression known as the Golden Ratio or a Fibonacci-like Progression.

Each of the embodiments serves, in the greater part, to enable fluids to move in their naturally preferred way, thereby reducing inefficiencies created through turbulence and friction which are normally found in apparatus commonly used for propagating fluid flow. Previously developed technologies have generally been less compliant with natural fluid flow tendencies.

The greater percentage of the surfaces of the flow controller of each of the embodiments described herein are generally designed in the greater part, in accordance with the Golden Section or Ratio or are designed to ensure the volume of fluid flowing through the flow controller expands or contracts in the greater part in accordance with the Golden Section and therefore it is a characteristic of each of the embodiments that the flow controller provides a fluid pathway which is of a spiralling configuration and which conforms at least in greater part to the characteristics of the Golden Section or Ratio.

Figure 1:
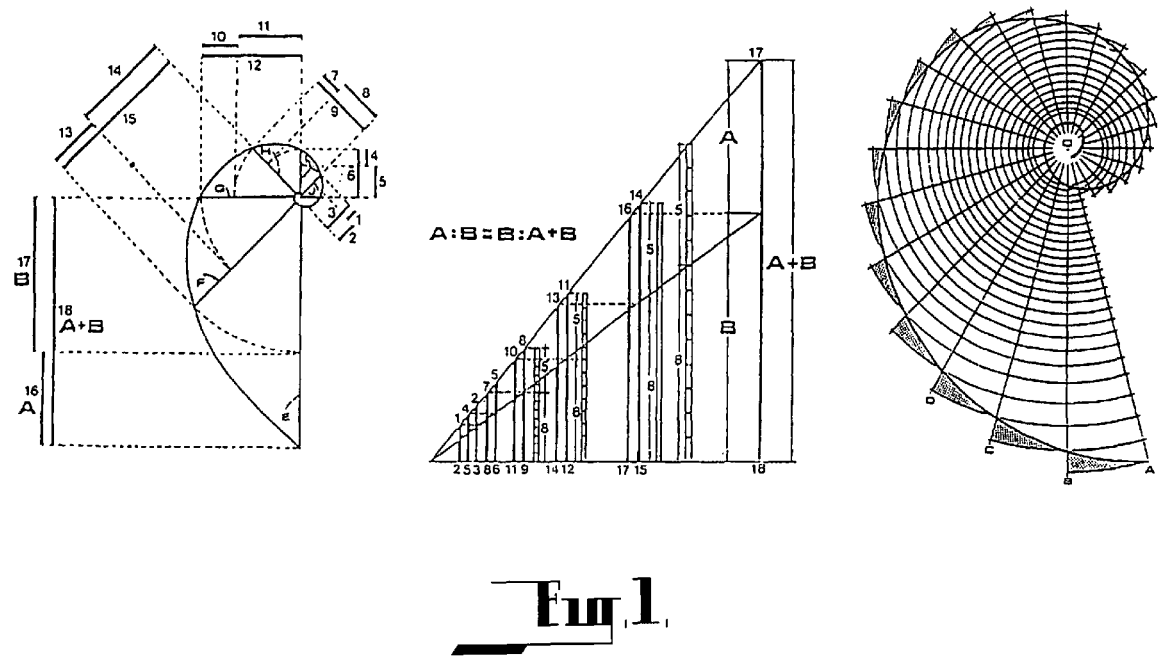
FIG. 1 is a chart of the Golden Section or Fibonacci Progression.

The characteristics of the Golden Section are illustrated in FIG. 1 which illustrates the unfolding of the spiral curve according to the Golden Section or Ratio. As the spiral unfolds the order of growth of the radius of the curve which is measured at equiangular radii (e.g., E, F, G, H, I and J) is constant. This can be illustrated from the triangular representation of each radius between each sequence which corresponds to the formula of a:b=b:a+b which conforms to the ratio of 1:0.618 approximately and which is consistent throughout the curve.

It is a characteristic of each of the embodiments that the curvature of the surfaces which form the flow controller takes a two dimensional or three dimensional shape equivalent to the lines of vorticity or streak lines found in a naturally occurring vortex. In general, the curvature of the surfaces substantially or in the greater part conform to the characteristics of the Golden Section or Ratio and that any variation in cross-sectional area of the flow controller also substantially or in greater part conforms to the characteristics of the Golden Section or Ratio. In at least some of the embodiments, the curvature of the active surface conforms to an equiangular spiral. Furthermore it has been found that the characteristics of the Golden Section or Ratio are found in nature in the form of the external and internal configurations of shells of the phylum Mollusca, classes Gastropoda and Cephalopoda and it is a common characteristic of at least some of the embodiments that the fluid pathway defined by the flow controller corresponds generally to the external or internal configuration of shells of one or more of the genera of the phylum Mollusca, classes Gastropoda and Cephalopoda.

It has been found that it is a characteristic of fluid flow that, when it is caused to undergo a fluid flow through a pathway having a curvature substantially or in greater part conforming to that of the Golden Section or Ratio that the fluid flow over the surfaces is substantially non-turbulent and as a result has a decreased tendency to cavitate. As a result, fluid flow over the surface is more efficient than has been encountered in previous instances where the pathway does not substantially or in greater part correspond to that of the Golden Section. As a result of the reduced degree of turbulence which is induced in the fluid in its passageway through such a pathway, the flow controllers according to the various embodiments can be used for conducting fluid with a greater efficiency than has previously been possible with conventional flow controllers of equivalent dimensional characteristics.

To assist the reader's understanding of the embodiments, the outer surfaces of the embodiments in the drawings are depicted in a way whereby they would correspond with the inner surfaces, such as would be the case if the walls of the embodiments are of constant thickness. In this way some concept of the helical/spiral configurations of the inner surfaces is conveyed. In practical fluid flow control devices, the configuration of the outer surface is not of significance to the embodiments and thus the outer surface could be configured as a simple surface such as a cone, leaving the inner surface complex as suggested in these drawings.

Figure 2:
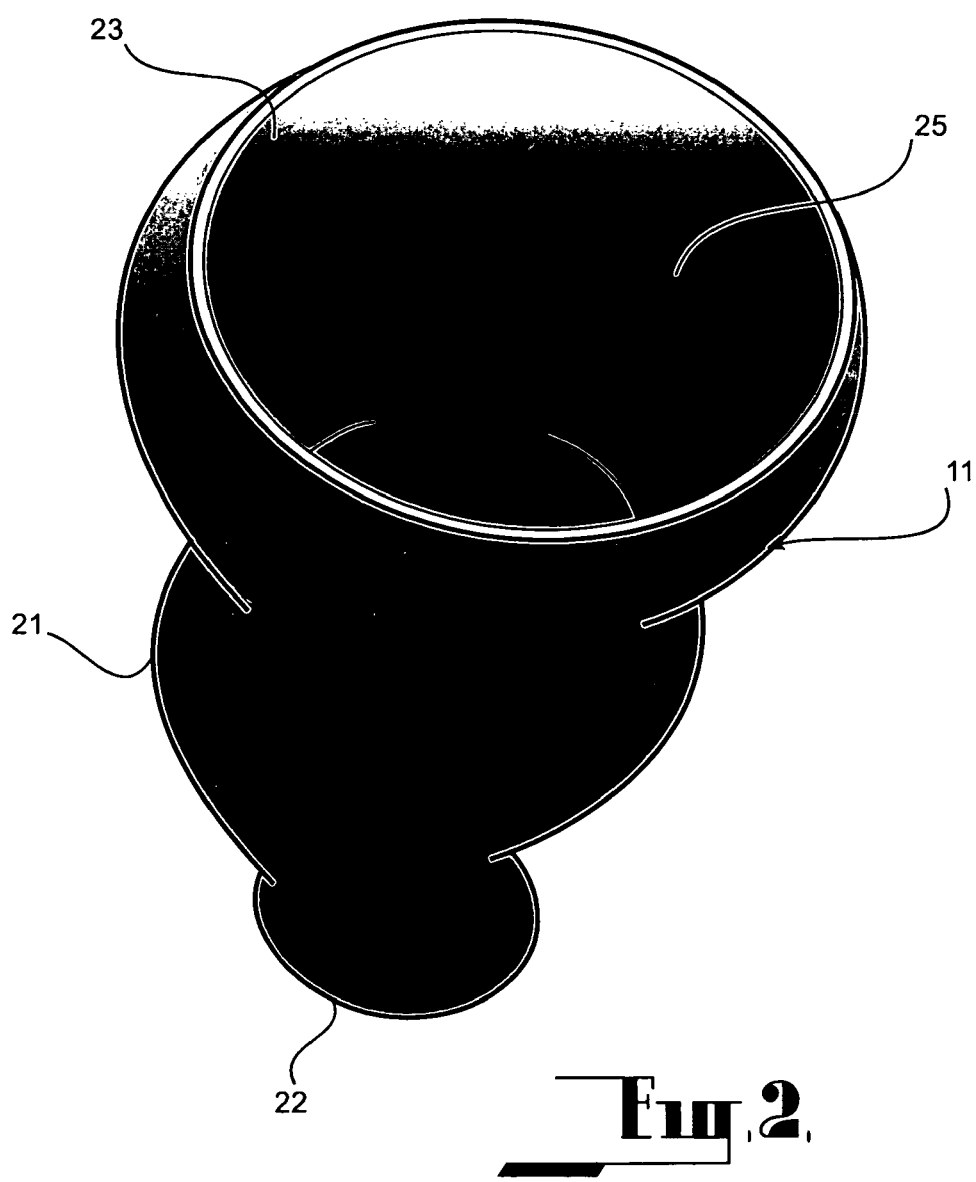
FIG. 2 is an isometric view of a nozzle according to a first embodiment.

The first embodiment takes the form of a nozzle as shown in FIG. 2. The nozzle 11 has a nozzle body 21, an outlet 22 and an inlet 23 which is adapted to be joined to a duct (not shown) such as a pipe, hose or similar providing a source of fluid under pressure. The nozzle body 21 has an internal surface 25 which reduces in cross-sectional area to the outlet 22. In addition, the internal surface of the nozzle may be seen to twist in a combination helical manner and spiralling manner between the input and the output. As indicated above, this twist is in a configuration which provides an active surface which conforms at least in greater part to the characteristics of the Golden Section or Ratio. It will be seen that as a result of the twist, fluid flowing in the nozzle is caused to be given a rotational motion about the longitudinal axis of the nozzle to thereby induce vortical motion in the fluid.

As a result of the vortical motion, the turbulence and friction in the nozzle are reduced considerably from that observed in a conventional nozzle having a simple conical internal surface.

Figure 3:
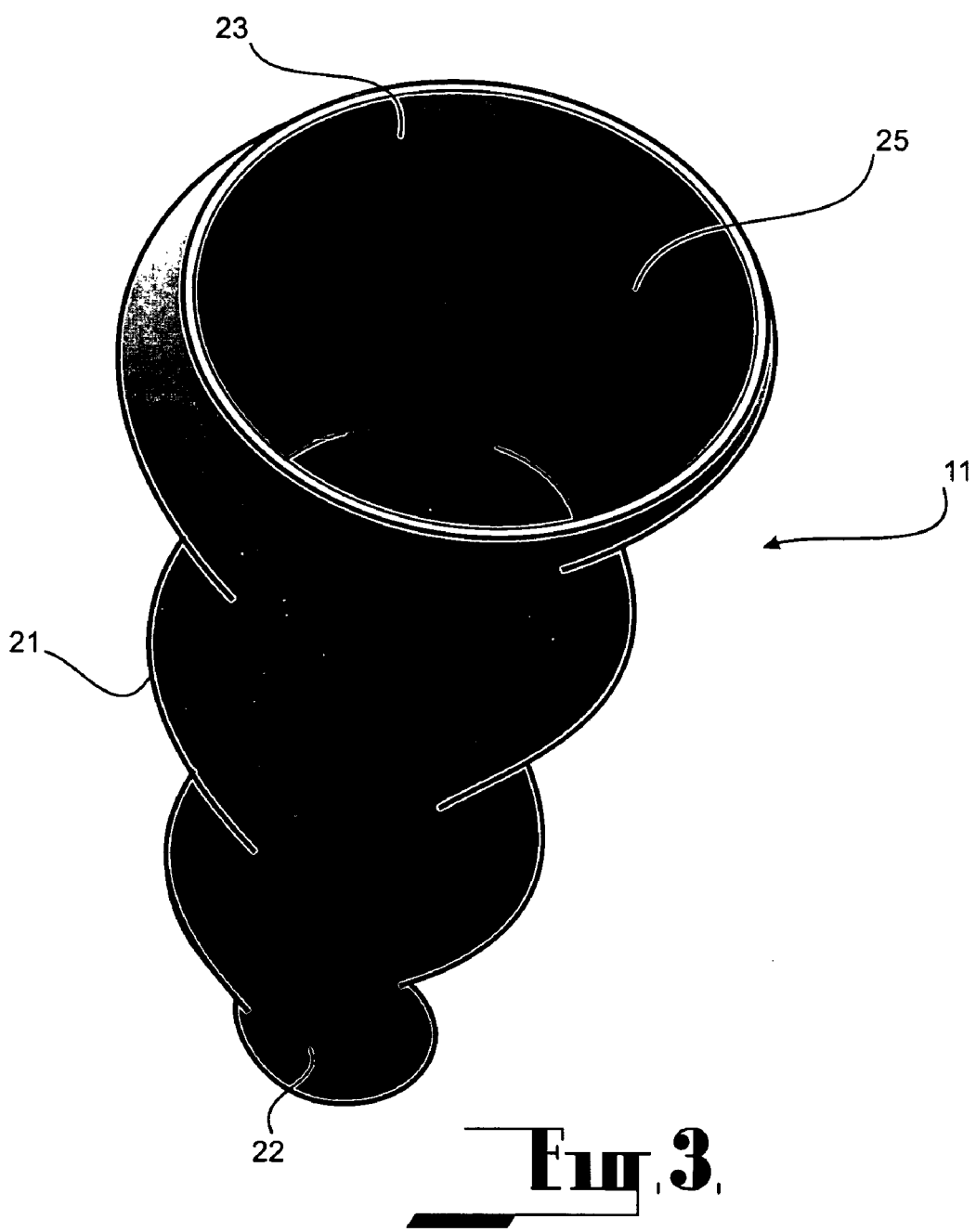
FIG. 3 is an isometric view of a nozzle according to a second embodiment.

A second embodiment takes the form of a nozzle as shown in FIG. 3. The second embodiment is of substantially similar construction to that of the first embodiment, and therefore in the drawings like parts are denoted with like numerals. The second embodiment differs from the first only in the particular design of the nozzle in that it is relatively longer and has greater twist. By varying the parameters of the nozzle, the formation of the vortical flow emitted from the nozzle outlet can be controlled. In certain applications, it will be desirable for the outlet to comprise a narrow vortical stream while in others, a diverging stream will be required to promote mixing of the output with the surrounding fluid.

Figure 4:
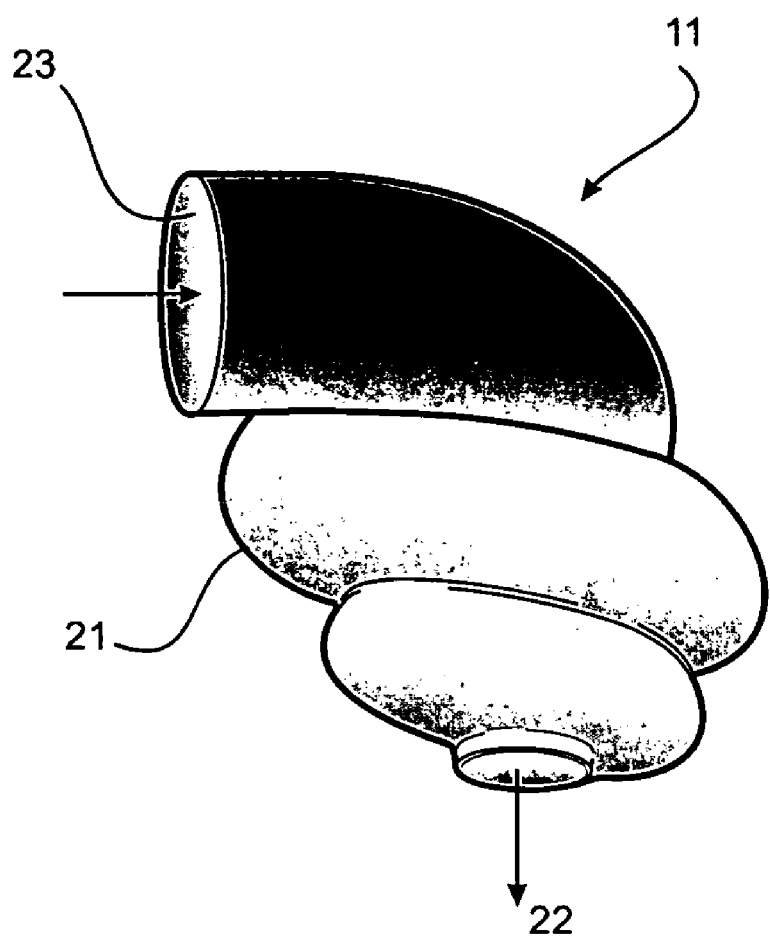
FIG. 4 is an isometric view of a nozzle according to a third embodiment.

A third embodiment takes the form of a nozzle as shown in FIG. 4. In this embodiment, the twist in the flow surfaces causes the direction of flow to be diverted transversely to that of the incoming flow stream. This redirection is achieved without significant loss because the internal surface of the nozzle is still configured to conform at least in greater part to the characteristics of the Golden Section or Ratio. As a result, turbulence is substantially avoided.

It will be appreciated that a whole class of embodiments are possible whereby the output flow is directed obliquely relative to the direction of the input flow stream.

Figure 5:
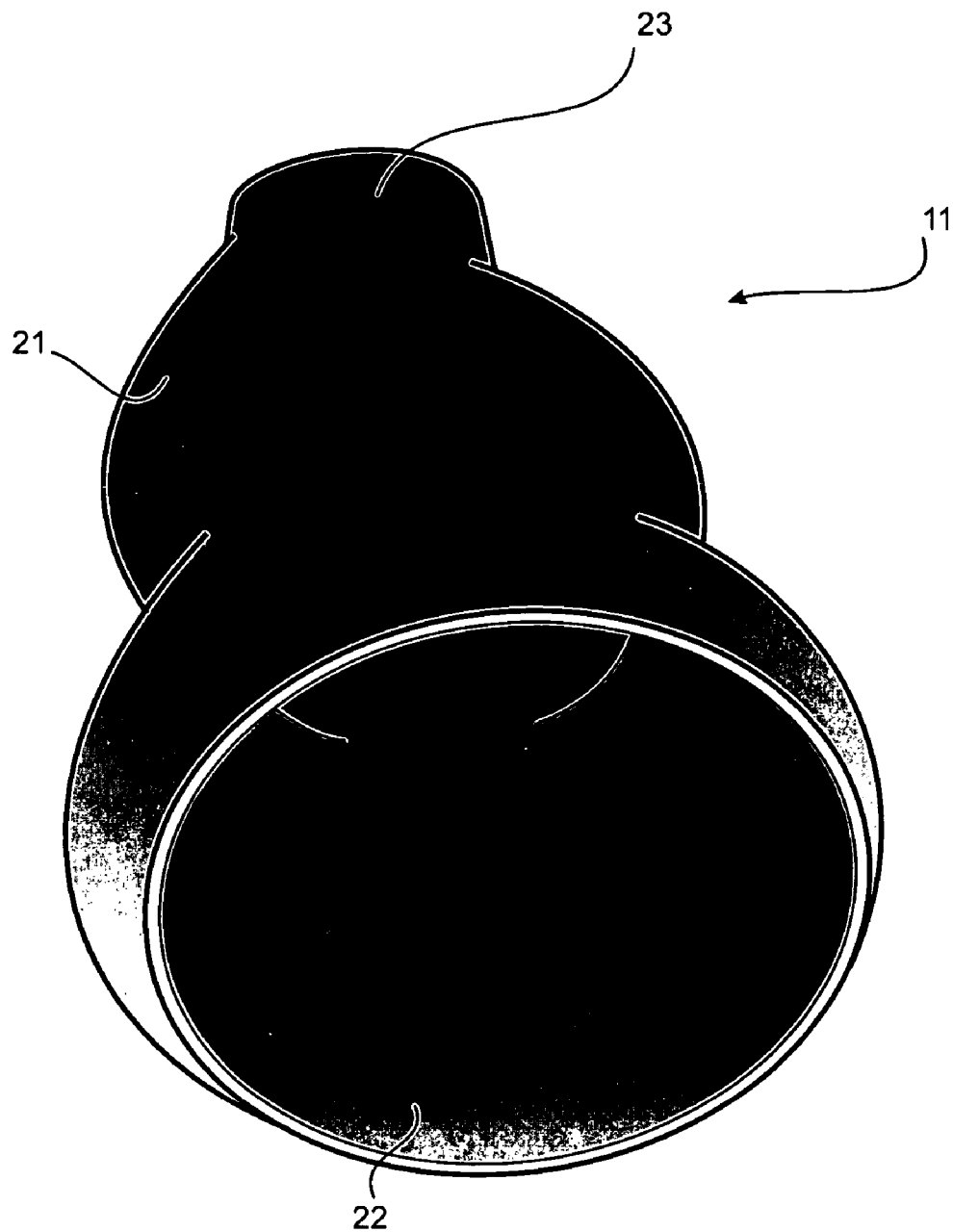
FIG. 5 is an isometric view of a diffuser according to a fourth embodiment.

A fourth embodiment takes the form of a diffuser as shown in FIG. 5. It may be appreciated that a diffuser may comprise a flow controller substantially identical to a nozzle but with direction of flow reversed. In this regard, the diffuser of FIG. 5 corresponds with the nozzle of FIG. 2 but having an internal surface 25 which increases in cross-sectional area to the outlet 22. Therefore, in the drawings like numerals are again used to depict like features. As with the nozzle, while the diffuser of FIG. 4 will induce vortical motion in the fluid flow, the precise characteristics of the output flow can be controlled by varying the design properties of the diffuser while maintaining the inner surface to conform at least in greater part to the characteristics of the Golden Section or Ratio.

It has been previously been noted that the cross-sectional area of the previous embodiments varies between the inlets to the outlets; for the nozzles, the area decreasing and for the diffusers, the area increasing. In a further development of the previous embodiments, it has been found advantageous, at least in certain circumstances to vary the incremental volume of the controller along the fluid pathway in a manner that conforms to the characteristics of the Golden Section or Ratio. To take advantage of this aspect, further embodiments of the fluid flow control devices as previously described are configured to conform with this constraint. As a result, the volume of fluid flowing through the flow controller expands or contracts in the greater part in accordance with the Golden Ratio.

Figure 6:
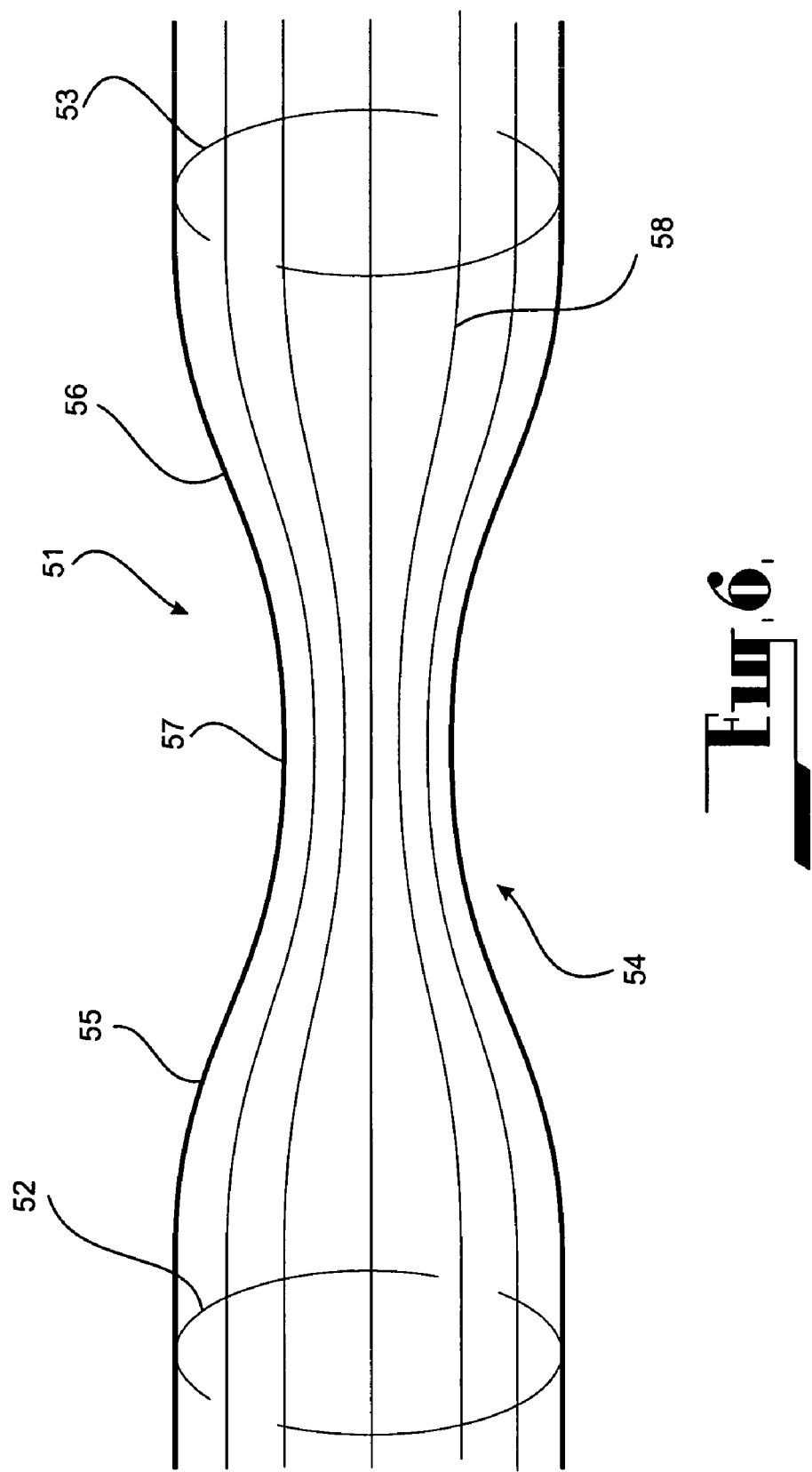
FIG. 6 is a sectional elevation of a conventional venturi tube.
Figure 7:
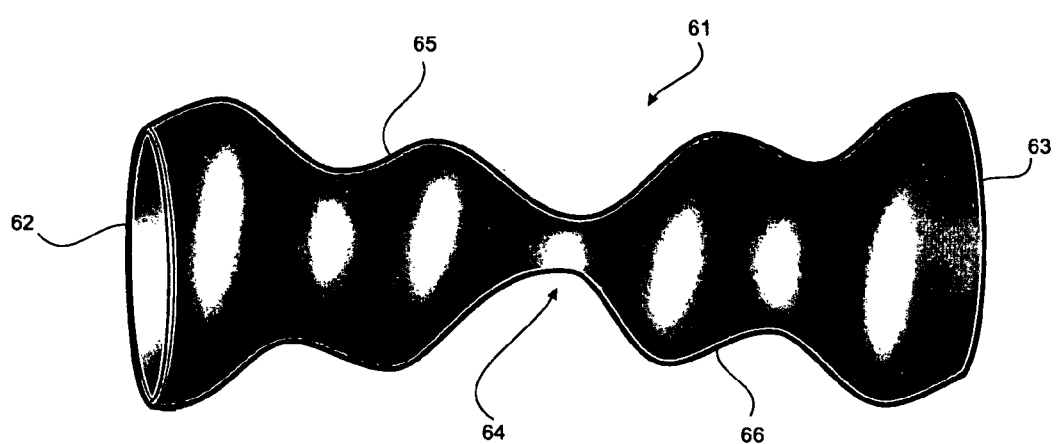
FIG. 7 is an isometric view of a venturi according to a fifth embodiment.

A fifth embodiment takes the form of a modified venturi tube as shown in FIG. 7. The modified venturi tube is best appreciated by comparison with a conventional venturi tube which is depicted In FIG. 6. In the conventional venturi tube of FIG. 6, a venturi 51 comprises an inlet 52, an outlet 53 and a constricted region 54. The constricted region 54 comprises an entry 55, an exit 56 and a region of maximum constriction 57. In the drawings, the flow is represented by flow lines 58.

When fluid is caused to flow into the inlet 52 of venturi 21, it is affected by the entry 55 wherein the diameter of the fluid pathway is progressively reduced until the region of maximum constriction 57 is reached. This constriction within the fluid pathway causes the speed at which the fluid is travelling to be increased. In accordance with well known laws of thermodynamics, this increase in fluid speed is accompanied by a reduction in pressure of the fluid. Subsequent to the region of maximum constriction 57, the fluid flow is affected by the exit 56 wherein the diameter of the fluid pathway is progressively increased to the outlet 53. In the exit 56, the fluid is progressively slowed.

It is known that the energy losses at a venturi are very significant. As mentioned above, these losses are caused both by friction and turbulence. In particular, it is well known that while the performance of a venturi can be increased by increasing the ratio of the inlet diameter relative to the diameter of maximum constriction 57, it is also known that in practice that any gains achieved by so reducing the region of maximum constriction are rapidly cancelled by the increased losses which result.

As can be seen in FIG. 7, the modified venturi 61 comprises an inlet 62, an outlet 63, a region of maximum constriction 64, an entry 65 and an exit 66. It will be readily perceived that these portions conform generally to corresponding portions of the conventional venturi tube of FIG. 6. In contrast however, the entry 64 and exit 65 are specifically designed to induce the fluid to move in accordance with the laws of Nature. As mentioned previously, the flow controller is designed with a pathway having a curvature substantially or in greater part conforming to that of the Golden Section or Ratio. The fluid is thereby induced into vortical flow the greater part of which conforms to the Golden Section or Ratio. The energy losses caused as a result of this vortical flow are considerably lower than those which result from a conventional venturi.

As a result of the considerably reduced energy losses caused by the modified venturi of the fifth embodiment, the apparatus may be used more effectively than previously has been possible. Firstly, it is possible to increase the ratio of the area of inlet relative to the area of maximum constriction. This increases the relative pressure difference that may be generated between the inlet and the region of maximum constriction. This broadens the scope of use of the device.

Figure 8:
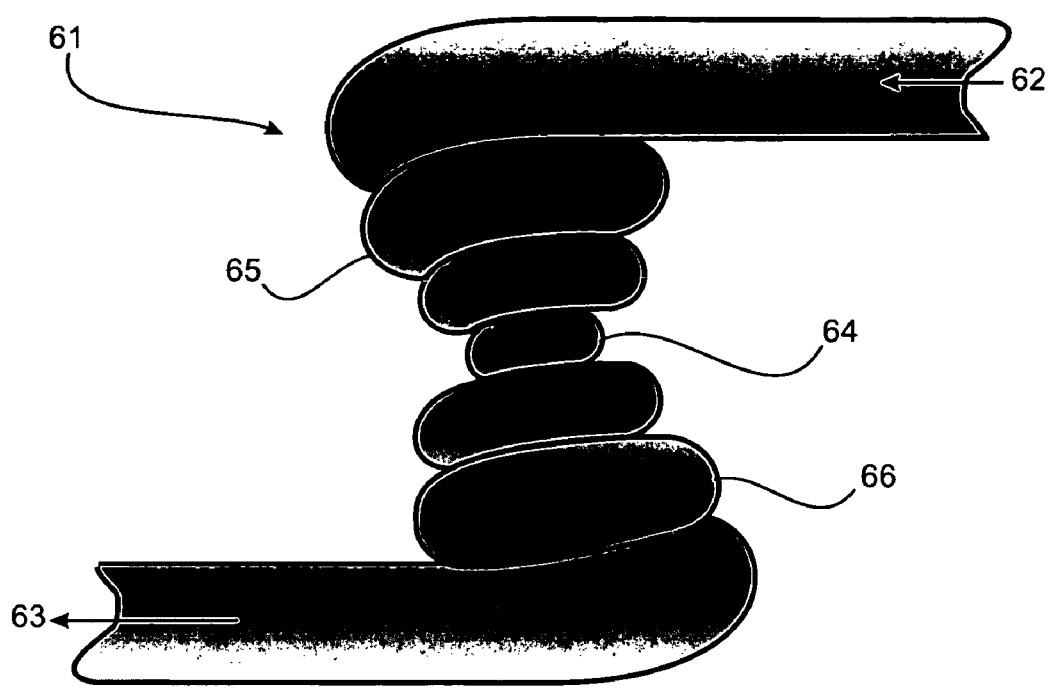
FIG. 8 is an isometric view of a venturi according to a sixth embodiment.

A sixth embodiment takes the form of a modified venturi tube as shown in FIG. 8. The sixth embodiment, although somewhat different in appearance, operates in substantially the same manner as that of fifth embodiment and so, in the drawings, like parts are denoted with like numerals. The sixth embodiment again comprises a duct, the area of cross-section of which reduces from an inlet to a portion of maximum constriction, and then increase to the outlet. The difference between the sixth embodiment and the fifth is that in the fifth embodiment the flow induces a vortex which has an axis of rotation which is co-linearly aligned with the central axis of the inlet, whereas in the sixth embodiment, the axis of rotation of the vortex is disposed substantially transversely to the central the axis of the inlet.

It has been noted previously that in the embodiments of the modified venturi tube, the cross-sectional area of the duct varies along the flow path, decreasing in the entry and increasing in the exit. As in the examples of the nozzles and diffusers, it has been found advantageous, at least in certain circumstances to vary the incremental volume of the controller along the fluid pathway in a manner that conforms to the characteristics of the Golden Section or Ratio. To take advantage of this aspect, further embodiments of the modified venturi tubes as previously described are configured to conform with this constraint. As a result, the volume of fluid flowing through the entry and exit of the venturi contracts or expands in the greater part in accordance with the Golden Ratio.

It has been found that, in at least certain configurations of the embodiments, the arrangements promote substantially radial laminar flow and it is believed that this assists the efficiency of the fluid flow within those arrangements It should be appreciated that the scope of the present invention need not be limited to the particular scope of the embodiments described above.

Throughout the specification, unless the context requires otherwise, the word "comprise" or variations such as "comprises" or "comprising", will be understood to imply the inclusion of a stated integer or group of integers but not the exclusion of any other integer or group of integers.

What is claimed is:

1. A method for altering a flow of fluid, the method comprising:

receiving fluid from a fluid source, receipt of the fluid occurring at a fluid flow control apparatus;

inducing the fluid received from the fluid source to have a rotational motion about an axis via a flow path of the fluid flow control apparatus, the flow path situated between an inlet and an outlet of the fluid flow control apparatus, the flow path including a cross-sectional area that progressively decreases from the inlet to a region of maximum constriction and progressively increases from the region of maximum constriction to the outlet, wherein the cross-sectional area includes both a region of increasing diameter and a region of decreasing diameter between the inlet and the region of maximum constriction and further includes both a region of increasing diameter and a region of decreasing diameter between the region of maximum constriction and the outlet; and expelling from the fluid flow control apparatus the fluid received from the fluid source, the expelled fluid including a vortical motion resulting from the induced rotation about the axis, and wherein a pressure differentiation is induced in the fluid between the receipt and expulsion of the fluid, the differentiation induced while the fluid traverses the fluid flow control apparatus.

2. The method of claim 1, further including accelerating the flow of fluid as a result of the pressure differentiation induced between the receipt and expulsion of the fluid.

3. The method of claim 1, further including decelerating the flow of fluid as a result of the pressure differentiation induced between the receipt and expulsion of the fluid.

4. The method of claim 1, further including accelerating and decelerating the flow of fluid as a result of the pressure differentiation induced between the receipt and expulsion of the fluid.

5. A fluid flow control apparatus for altering a flow of fluid, the fluid flow control apparatus comprising:

an inlet configured to receive fluid from a fluid source;

an outlet configured to expel the fluid received from the fluid source; and a flow path situated between the inlet and the outlet and within a body of the fluid flow controller apparatus, the flow path including a cross-sectional area that progressively decreases from the inlet to a region of maximum constriction and progressively increases from the region of maximum constriction to the outlet, wherein the cross-sectional area includes both a region of increasing diameter and a region of decreasing diameter between the inlet and the region of maximum constriction and further includes both a region of increasing diameter and a region of decreasing diameter between the region of maximum constriction and the outlet, the cross-sectional area varying along the length of the flow path thereby inducing pressure differentiation within the body of the fluid flow control apparatus, the flow path configured to convey the fluid from the inlet to the outlet and wherein at least a portion of the length of the body includes an internal surface area configured to induce a rotational motion about an axis as the fluid traverses the flow path thereby resulting in a vortical motion in the fluid as the fluid is expelled from the outlet.

6. The fluid flow control apparatus of claim 5, wherein at least a portion of the internal surface area substantially conforms to a logarithmic curve, wherein the radius of the logarithmic curve measured at equiangular radii unfolds at a constant order of growth.

7. The fluid flow control apparatus of claim 5, wherein a portion of the cross-sectional area of the flow path varies logarithmically and the radius of the logarithmic variation measured at equiangular radii unfolds at a constant order of growth.

8. The fluid flow control apparatus of claim 5, wherein the cross-sectional area of the flow path causes a logarithmic variance in the incremental volume of the flow path.

9. The fluid flow control apparatus of claim 5, wherein the internal surface area substantially conforms to the external or interior configuration of a shell of the phylum Mollusca.

10. The fluid flow control apparatus of claim 5, wherein the internal surface area substantially conforms to the external or interior configuration of a shell of the genera *Volutidea*.

11. The fluid flow control apparatus of claim 5, wherein the vortical motion in the fluid expelled from the outlet is further substantially radially laminar.

12. The fluid flow control apparatus of claim 5, wherein the inlet is configured to receive a pressurized fluid source.

13. The fluid flow control apparatus of claim 5, wherein the vortical motion of the fluid expelled from the outlet reduces turbulence in the flow of fluid.

14. The fluid flow control apparatus of claim 5, wherein the vortical motion of the fluid expelled from the outlet reduces friction in the flow of fluid.

15. The fluid flow control apparatus of claim 5, wherein the outlet is configured to generate a diverging vortical stream.

16. The fluid flow control apparatus of claim 5, wherein the flow path is transversely diverted with respect to the received fluid.

17. The fluid flow control apparatus of claim 5, wherein the internal surface area substantially conforms to the external or interior configuration of a shell of the class Gastropoda.

18. The fluid flow control apparatus of claim 5, wherein the internal surface area substantially conforms to the external or interior configuration of a shell of the class Cephalopoda.

19. The fluid flow apparatus of claim 5, wherein the internal surface area substantially conforms to the external or interior configuration of a shell of the genera *Argonauta*.

20. The fluid flow apparatus of claim 5, wherein the internal surface area substantially conforms to the external or interior configuration of a shell of the genera *Nautilus*.

21. The fluid flow apparatus of claim 5, wherein the internal surface area substantially conforms to the external or interior configuration of a shell of the genera *Conidea*.

22. The fluid flow apparatus of claim 5, wherein the internal surface area substantially conforms to the external or interior configuration of a shell of the genera *Turbinidea*.

23. The fluid flow control apparatus of claim 5, wherein the variance in the cross-sectional area includes an increase along the length of the flow path from the inlet to the outlet.

24. The fluid flow control apparatus of claim 5, wherein the flow path is configured in a spiral.

25. The fluid flow control apparatus of claim 24, wherein the spiral is a logarithmic helix.

26. The fluid flow control apparatus of claim 24, wherein the spiral is a volute.

27. The fluid flow control apparatus of claim 24, wherein the spiral is a whorl.

* * * * *